US012638857B2

(12) United States Patent
Mizuno et al.

(10) Patent No.: US 12,638,857 B2
(45) Date of Patent: May 26, 2026

(54) INFORMATION PROCESSING SYSTEM AND SELF-DRIVING ASSISTANCE METHOD

(71) Applicants: AGC Inc., Tokyo (JP); TOYOTA JIDOSHA KABUSHIKI KAISHA, Toyota (JP)

(72) Inventors: Takanobu Mizuno, Toyota (JP); Ryuta Sonoda, Tokyo (JP); Kentaro Oka, Tokyo (JP)

(73) Assignees: AGC Inc., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 18/340,178

(22) Filed: Jun. 23, 2023

(65) Prior Publication Data

US 2023/0331251 A1     Oct. 19, 2023

Related U.S. Application Data

(63) Continuation of application No. PCT/JP2022/003040, filed on Jan. 27, 2022.

(30) Foreign Application Priority Data

Jan. 29, 2021     (JP) ................................. 2021-012890

(51) Int. Cl.
*G05D 1/247*          (2024.01)
*G05D 1/225*          (2024.01)
          (Continued)

(52) U.S. Cl.
CPC ............. *G05D 1/247* (2024.01); *G05D 1/225* (2024.01); *G05D 1/249* (2024.01); *G08G 1/0116* (2013.01);
          (Continued)

(58) Field of Classification Search
CPC ........ G05D 2/247; G05D 1/225; G05D 1/249; G08G 1/0116; G08G 1/09; G08G 1/096783; H04W 4/44
See application file for complete search history.

(56) References Cited

U.S. PATENT DOCUMENTS

| | | | |
|---|---|---|---|
| 11,062,597 B2 * | 7/2021 | Shirakata ............. | H04B 7/0617 |
| 2010/0232404 A1 * | 9/2010 | Chen ....................... | H04W 4/44 |
| | | | 370/470 |

(Continued)

FOREIGN PATENT DOCUMENTS

| | | | | |
|---|---|---|---|---|
| CN | 109068299 A | * | 12/2018 | ............. H04W 4/44 |
| JP | 2000-111644 A | | 4/2000 | |

(Continued)

OTHER PUBLICATIONS

Translation of CN-109068299-A, 18 pages (Year: 2018).*

(Continued)

*Primary Examiner* — Dale W Hilgendorf
(74) *Attorney, Agent, or Firm* — Oblon, McClelland, Maier & Neustadt, L.L.P.

(57)          ABSTRACT

Disclosed is an information processing system including: an information processor installed on a roadside, and a communication antenna installed on the roadside, wherein the information processor includes: a vehicle information acquisition unit to acquire vehicle information relating to one or more vehicles to be assisted located in a coverage area covered by the communication antenna, a transmit data generation unit to generate transmit data based on the vehicle information acquired by the vehicle information acquisition unit, and a data sending unit to send the transmit data generated by the transmit data generation unit to the vehicle to be assisted via the communication antenna, and the transmit data includes at least one of vehicle position (Continued)

information indicating the position of the vehicle to be assisted, and drive control information.

27 Claims, 9 Drawing Sheets

(51) Int. Cl.

| | |
|---|---|
| *G05D 1/249* | (2024.01) |
| *G08G 1/01* | (2006.01) |
| *G08G 1/09* | (2006.01) |
| *G08G 1/0967* | (2006.01) |
| *H04W 4/44* | (2018.01) |

(52) U.S. Cl.
CPC ......... *G08G 1/09* (2013.01); *G08G 1/096783* (2013.01); *H04W 4/44* (2018.02)

(56) References Cited

U.S. PATENT DOCUMENTS

| | | | | |
|---|---|---|---|---|
| 2014/0066091 | A1* | 3/2014 | Varoglu | H04W 4/023 |
| | | | | 455/456.1 |
| 2016/0069985 | A1* | 3/2016 | Kwakkernaat | G01S 13/751 |
| | | | | 342/146 |
| 2016/0148267 | A1 | 5/2016 | Pittman et al. | |
| 2016/0272199 | A1 | 9/2016 | Kawahara et al. | |
| 2017/0084177 | A1* | 3/2017 | Matsuoka | G08G 1/166 |
| 2018/0144623 | A1* | 5/2018 | Shirakata | G08G 1/09675 |
| 2018/0301034 | A1 | 10/2018 | Morita | |
| 2018/0328734 | A1 | 11/2018 | Kasslatter et al. | |
| 2019/0072638 | A1 | 3/2019 | Wang et al. | |
| 2019/0182641 | A1* | 6/2019 | Tawadrous | G01S 19/00 |
| 2019/0311616 | A1* | 10/2019 | Jin | G05D 1/0297 |
| 2020/0100120 | A1* | 3/2020 | Oyabu | G08G 1/0112 |
| 2020/0111346 | A1* | 4/2020 | Kodama | H04W 4/023 |
| 2020/0118428 | A1* | 4/2020 | Takeda | G08G 1/087 |
| 2020/0370890 | A1* | 11/2020 | Hamilton | G08G 1/04 |
| 2021/0005085 | A1* | 1/2021 | Cheng | G08G 1/012 |
| 2021/0012282 | A1 | 1/2021 | Smith et al. | |
| 2021/0356554 | A1* | 11/2021 | Mizuno | G05D 1/0278 |
| 2021/0376462 | A1* | 12/2021 | Chen | H01Q 3/24 |
| 2022/0043099 | A1* | 2/2022 | Da | H04L 5/0048 |
| 2022/0078581 | A1* | 3/2022 | Choi | G01S 5/0269 |
| 2023/0343208 | A1* | 10/2023 | Ueno | G08G 1/09 |
| 2024/0119832 | A1* | 4/2024 | Kato | G06V 20/58 |

FOREIGN PATENT DOCUMENTS

| | | | | |
|---|---|---|---|---|
| JP | 2011-146053 | A | 7/2011 | |
| JP | 3185100 | | 7/2013 | |
| JP | 2015-61221 | A | 3/2015 | |
| JP | 2018-58588 | A | 4/2018 | |
| JP | 2019-82487 | A | 5/2019 | |
| WO | WO-2019082649 | A1 * | 5/2019 | G08G 1/09 |
| WO | WO 2019/245049 | A1 | 12/2019 | |
| WO | WO 2020/125310 | A1 | 6/2020 | |
| WO | WO 2020/189453 | A1 | 9/2020 | |

OTHER PUBLICATIONS

Translation of WO-2019082649-A1, 31 pages (Year: 2019).*

International Search Report issued Apr. 12, 2022 in PCT/JP2022/003040, filed on Jan. 27, 2022, 3 pages.

Anonymous, "Traffic Detector Handbook: Third Edition—vol. II—FHWA-HRT-06-139", Oct. 1, 2006 (Oct. 1, 2006), pp. 1-28, XP093312997, Retrieved from the Internet: URL:https://www.fhwa.dot .gov/publications/research/operation/its/06139/chapt5d.cfm.

Anonymous, "AGC Completes Development of 5G-compatible 'Glass Antenna that Adds Cellular Base Station Capabilities to Windows' | News | AGC", Jun. 3, 2020 (Jun. 3, 2020), pp. 1-4, XP093313018, Retrieved from the Internet: URL:https://www.agc.com/en/news/detail/1200822_2814.html.

* cited by examiner

10

Processor

60

60

80

12

60

12

70

R4

212

70

214

R4

90

1A

10A

12A

Processor

Communication
antenna

1

INFORMATION PROCESSING SYSTEM AND SELF-DRIVING ASSISTANCE METHOD

CROSS-REFERENCE TO RELATED APPLICATIONS

This application is a continuation of PCT Application No. PCT/JP2022/003040, filed on Jan. 27, 2022, which is based upon and claims the benefit of priority from Japanese Patent Application No. 2021-012890 filed on Jan. 29, 2021. The contents of those applications are incorporated herein by reference in their entireties.

TECHNICAL FIELD

The present disclosure relates to an information processing system and a self-driving assistance method.

BACKGROUND ART

A vehicle comprising a plurality of communication devices each having a receiving part for receiving radar waves, an amplifier for amplifying the radar waves received by the receiving part, and a sending part for sending the radar weaves amplified by the amplifier, has been known.

PRIOR ART DOCUMENTS

Patent Documents

Patent Document 1: JP-A-2019-082487

DISCLOSURE OF INVENTION

Technical Problem

However, in the above prior art, since control information required for self-driving is calculated by a processor mounted in a mobile body, the calculation process load on the processer mounted in the mobile body tends to be relatively high.

Under these circumstances, it is an object of the present disclosure to realize low latency in driving assistance in a state where the process load on a processor mounted on a vehicle is reduced.

Solution to Problem

According to one aspect of the present disclosure, provided is an information processing system to assist a vehicle to be assisted having a self-driving function in driving, which comprises:

an information processor installed on a roadside, and a communication antenna installed on the roadside, wherein the information processor comprises:

a vehicle information acquisition unit to acquire vehicle information relating to one or more vehicles to be assisted located in a coverage area covered by the communication antenna, a transmit data generation unit to generate transmit data based on the vehicle information acquired by the vehicle information acquisition unit, and a data sending unit to send the transmit data generated by the transmit data generation unit to the vehicle to be assisted via the communication antenna, and

the transmit data includes at least one of vehicle position information indicating the position of the vehicle to be assisted, and drive control information.

Advantageous Effects of Invention

According to the present disclosure, low latency in driving assistance can be realized in a state where the process load on a processor mounted on a vehicle is reduced.

DESCRIPTION OF EMBODIMENTS

Now, embodiments are described in detail with reference to drawings.

Now, an information processing system 1 according to an essential embodiment will be described first, and then a self-driving assistance method according to the respective embodiments having the essential embodiment further specified will be described.

Figure 1:
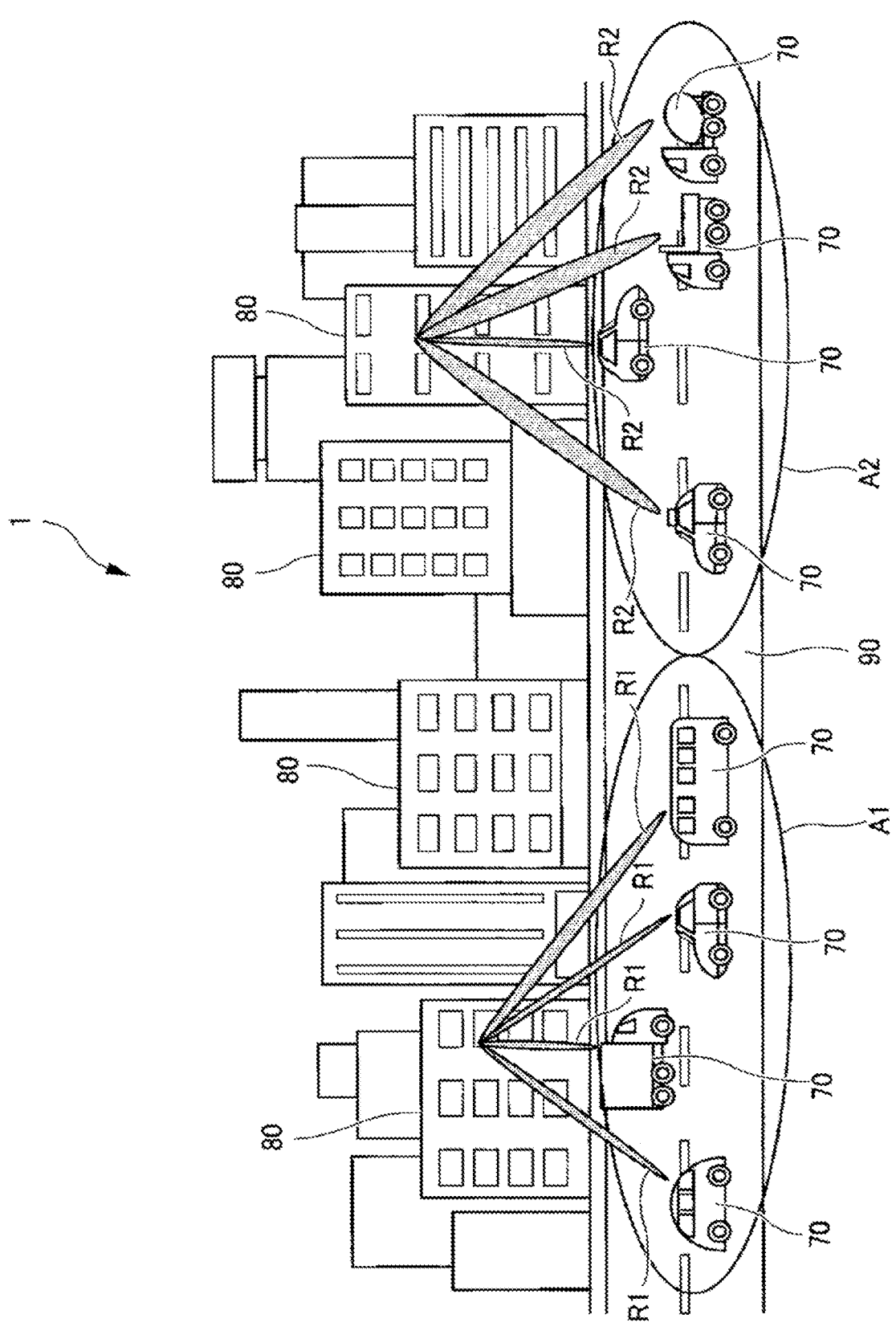
FIG. 1 is a diagram schematically illustrating an information processing system according to an essential embodiment.
Figures 2, 3:
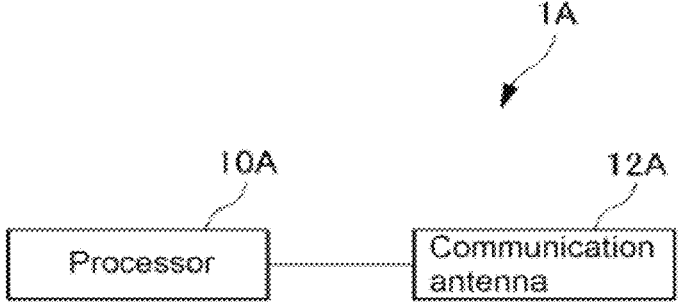
FIG. 2 is a view schematically illustrating a part of the coverage area shown in FIG. 1.
FIG. 3 is a schematic view illustrating the constitution of an information processing system according to embodiment 1.

FIG. 1 is a diagram schematically illustrating an information processing system 1 according to an essential embodiment, and illustrating the driving environment in which buildings 80 are lined along a road 90. FIG. 2 is a view schematically illustrating a part of the coverage area A1 shown in FIG. 1. FIG. 1 schematically illustrates radio waves relating to communication, by hatched areas R1, R2.

The information processing system 1 is an information processing system to assist driving of the vehicle 70 to be assisted, having a self-driving function. The self-driving function may be a self-driving function at the driving automation level 3 or higher.

The information processing system 1 has a processor 10 (an example of the information processor) and a communication antenna 12, on the roadside.

The processor 10 may be constituted by a computer and may have a capacity higher than, for example, an in-vehicle computer (for example, ECU (Electronic Control Unit)) which may be mounted in the vehicle 70 to be assisted. The processor 10 may be realized by a plurality of computers or CPUs (Central Processing Units). Further, the plurality of computers may include a server computer.

The communication antenna 12 is electrically connected to the processor 10. The communication antenna 12 is installed to cover a coverage area covering a road section which the vehicle 70 to be assisted passes. In a case where the road section to be covered is relatively long, the communication antennas 12 may be installed at shorter road section intervals. In the example shown in FIG. 1, two coverage areas A1 and A2 are schematically illustrated.

A plurality of communication antennas 12 may be installed in one road section. Further, the communication antenna 12 may realize distributed Multiple-Input Multiple-Output (MIMO) system. Further, in the fifth generation mobile communication system (hereinafter sometimes referred to simply as "5G"), the communication antenna 12 may be realized by an array antenna. In such a case, by changing the phase of the array antenna, the direction of beams can be controlled to an optional direction. That is, by the 5G beam forming function, stable communication with less radio interference with each vehicle 70 to be assisted can be realized.

The communication antenna 12 is installed preferably inside a building 80, whereby when the processor 10 is installed inside the building 80, such as on the ceiling, the communication antenna 12 and the processor 10 will easily be connected electrically via wiring.

The communication antenna 12 is installed preferably on a window glass 60 of the building 80, whereby the communication antenna 12 can be installed on the roadside utilizing an existing infrastructure, without providing special dedicated facilities. Further, by using the window glass 60 of the building 80, the communication antenna 12 will easily be installed at an appropriate height. For example, the communication antenna 12 may be installed at a height of 3 meters (m) to 15 m from the ground, whereby efficient communication with the vehicle 70 to be assisted located on the ground can be realized. Further, by using the window glass 60 of the building 80, in a case where a plurality of communication antennas 12 is installed, the difference in height from the ground among the plurality of communication antennas 12 can be suppressed to be within for example 1 m, whereby more efficient communication with the vehicle 70 to be assisted located on the ground can be realized.

Although the communication antenna 12 is preferably installed on the interior side of the window glass 60 of the building 80, it may be installed on the exterior side of the window glass 60 of the building 80, whereby communication is less likely to be affected by the window glass 60, and more efficient communication with the vehicle 70 to be assisted located on the ground can be realized.

Further, the communication antenna 12 may be installed on a sash to which the window glass 60 of the building 80 is attached.

The building 80 means an artificial architecture having a height from the ground, and may be one having a living space, such as an office, a residence or a hotel, or may be a steel tower, a utility pole, a signal or the like. The building on which the communication antenna 12 is installed is not a facility dedicated to communication, and thus the information processing system 1 can be realized utilizing an existing infrastructure.

The window glass 60 is usually transparent but may be translucent or opaque. The material of the window glass 60 may be optional and may, for example, be inorganic glass such as soda lime glass, borosilicate glass, aluminosilicate glass, lithium silicate glass, alkali-free glass or quartz glass, or organic glass such as a polycarbonate or an acrylic resin.

The information processing system 1 establishes two way communication state with the vehicle 70 to be assisted via the communication antenna 12 (see arrow R4 in FIG. 2) thereby to assist the vehicle 70 to be assisted in driving. Specifically, the information processing system 1 sends vehicle position information indicating the position of the vehicle 70 to be assisted, and drive control information. The vehicle 70 to be assisted which received the vehicle position information and the drive control information can perform self-driving by the self-driving function based on the vehicle position information and the drive control information.

According to the essential embodiment, the vehicle position information and the drive control information are generated by the processor 10 of the information processing system 1. Thus, the processor mounted in the vehicle 70 to be assisted is not required to calculate the vehicle position, and the process load on the processor mounted in the vehicle 70 to be assisted can be reduced. That is, by a computer (including a server computer) which realizes the processor 10 conducting processes relating to drive control, separately from the computer mounted in the vehicle 70 to be assisted, the load on the processor mounted in the vehicle can be reduced by utilizing edge computing technology. Particularly in 5G, by edge computing, low latency of 1 ms, which is 1/10 of 4G (fourth generation mobile communication system) can be realized. By such low latency, real-time control of the vehicle 70 to be assisted can be realized, and thus support system for autonomous self-driving and for distributed self-driving having part of functions distributed, can be realized.

As described above, by the information processing system 1 according to the essential embodiment, low latency of driving assistance can be realized in a state where the process load on the processor mounted in the vehicle is reduced.

By the information processing system 1 according to the essential embodiment, low latency of driving assistance can be realized in a state where the process load on the processor mounted in the vehicle is reduced, and thus the communication antenna 12 is installed preferably to cover the coverage area at a place with relatively heavy traffic. That is, the communication antenna 12 is installed so that the coverage area covers an intersection or a road section with traffic heavier than a predetermined standard, whereby low latency of driving assistance by the information processing system 1 can be realized, at a place where the process lead tends to be high with many objects to be monitored, etc., and at a place where the traffic environment is likely to dynamically change.

Further, by the information processing system 1 according to the essential embodiment, the coverage area covered by the communication antenna 12 can be expanded by disposing a large number of communication antennas 12, and the region in which low latency of driving assistance is realized can be thereby expanded. In such a case, the coverage area covered by the communication antenna 12 may be expanded so as to cover both the communication region based on 3G (third generation mobile communication system) and 4G, and the communication region based on 5G. And ultimately, the function to receive satellite radio waves by GNSS (Global Navigation Satellite System), and the function to calculate the own position based on the satellite radio waves, periphery monitoring sensors (for example, an in-vehicle camera or a radar sensor) in the processor mounted in the vehicle 70 to be assisted, may be removed, and in such a case, weight saving of the vehicle body can be achieved. Here, the information processing system 1 according to the essential embodiment may be utilized complementary to the function to calculate the own position of the processor mounted in the vehicle 70 to be assisted, or may be utilized as the redundant system for the function to calculate the own position of the processor mounted in the vehicle 70 to be assisted.

Now, the information processing system 1 according to a plurality of embodiments will be described in further detail with reference to FIG. 3 and subsequent Figs. In the following, constituents which may be the same are represented by the same reference symbols and their description may sometimes be omitted.

Embodiment 1

Figure 4:
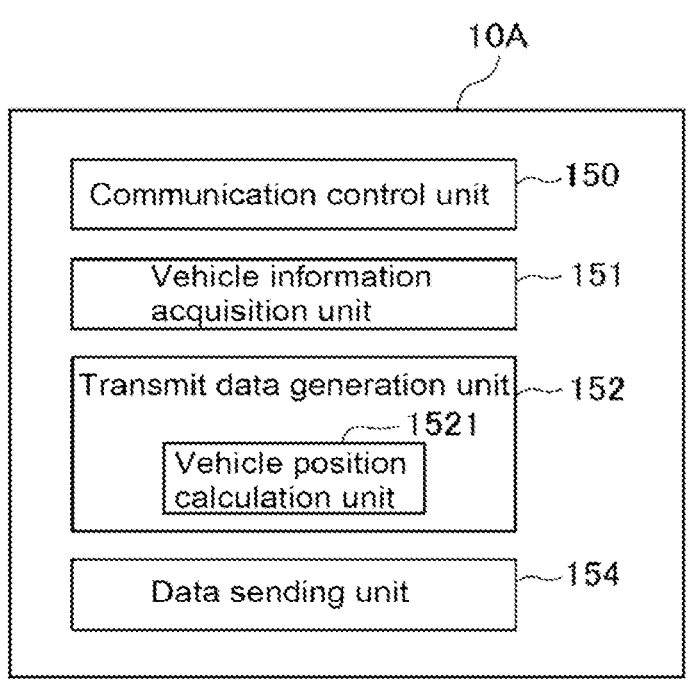
FIG. 4 is a schematic view illustrating functions of an information processing system according to embodiment 1.

FIG. 3 is a schematic view illustrating the constitution of the information processing system 1A according to embodiment 1. FIG. 4 is a schematic view illustrating functions of the information processing system 1A.

The information processing system 1A has a processor 10A as an example of the above processor 10, and a communication antenna 12A as an example of the above communication antenna 12. A plurality of communication antennas 12A is installed in the form of an array antenna. The array antenna is advantage to generation of vehicle position information (calculation of the position of the vehicle 70 to be assisted) described later, in that space information can be utilized. The communication antennas 12A may be installed on a plurality of window glasses 60, or an array antenna may be realized on a single window glass 60. As the conductor constituting the communication antennas 12A, for example, an oxide such as indium tin oxide (ITO) or tin oxide, or a Low-E multilayered conductor may be used. Low-E is an abbreviation for Low Emissivity, and a conductive transparent oxide film and one having an about 10 nm-thick silver film sandwiched between dielectric layers and coated with a silver multilayer film having a low reflectance in visible region and a high reflectance in infrared region, have been known. Further, the conductor constituting the communication antenna 12A may be a metal such as Au (gold), Ag (silver), Cu (copper), Al (aluminum), Cr (chromium), Pd (lead), Zn (zinc), Ni (nickel) or Pt (platinum). In a case where a metal is used for the conductor constituting the communication antenna 12A, the conductor may be formed into a mesh so as to have light transparency. The mesh here means a state where the conductor has on its plane through holes in a network form. Further, the conductor constituting the communication antenna 12A may be disposed on a glass plate. The glass plate having the conductor disposed thereon may be attached to the window glass 60 via a resin or metal spacer.

The processor 10A has, as shown in FIG. 4, a communication control unit 150, a vehicle information acquisition unit 151, a transmit data generation unit 152 and a data sending unit 154.

The communication control unit 150 establishes communication with a plurality of vehicles 70 to be assisted located in the coverage area covered by the communication antenna 12A, and continues communication with the plurality of vehicles 70 to be assisted located in the coverage area, at certain intervals.

The vehicle information acquisition unit 151 acquires vehicle information relating to a plurality of vehicles to be assisted located in the coverage area covered by the communication antenna 12A, via communication established by the communication control unit 150 (communication with each vehicle 70 to be assisted).

According to the embodiment 1, vehicle information is information based on radio waves sent from an in-vehicle antenna 212 (see FIG. 2) mounted in the vehicle 70 to be assisted. The information based on radio waves from the vehicle 70 to be assisted is information to calculate the vehicle position of the vehicle 70 to be assisted, and is different from information indicating the vehicle position of the vehicle 70 to be assisted. The information based on radio waves sent from the in-vehicle antenna 212 (see FIG. 2) may include an identifier to identify the vehicle 70 to be assisted, time information, etc.

The transmit data generation unit 152 generates transmit data for each vehicle 70 to be assisted, based on the vehicle information acquired by the vehicle information acquisition unit 151.

In the embodiment 1, the transmit data generation unit 152 has a vehicle position calculation unit 1521, and the transmit data generated by the transmit data generation unit 152 include the vehicle position information of each vehicle 70 to be assisted.

The vehicle position calculation unit 1521 calculates the vehicle position of each vehicle 70 to be assisted based on the vehicle information of the vehicle 70 to be assisted acquired by the vehicle information acquisition unit 151, and known position information relating to the communication antenna 12A. The method of calculating the position of the vehicle 70 to be assisted, based on radio waves sent from the vehicle 70 to be assisted as an object of which the position is to be calculated, is optional, and may be AoA (Angle Of Arrival), RSS (Received Signal Strength), TOA (Time of Arrival), TDOA (Time Difference of Arrival), fingerprint-based localization algorithm, or an optional combination thereof, of radio waves from the vehicle 70 to be assisted. According to the position calculation method based on such method, the position of the vehicle 70 to be assisted can be precisely calculated based on radio waves sent from the in-vehicle antenna 212 mounted in the vehicle 70 to be assisted, without using satellite radio waves by GNSS (Global Navigation Satellite System). For example, the vehicle position calculation unit 1521 calculates the position of the vehicle to be assisted, with accuracy with an error within 2 m, preferably within 50 cm, more preferably within 5 cm.

The data sending unit 154 sends the transmit data generated by the transmit data generation unit 152, for each vehicle 70 to be assisted, to the vehicle 70 to be assisted via communication established by the communication control unit 150 (communication with each vehicle 70 to be assisted).

In such a manner, according to the embodiment 1, the information processing system 1A calculate the position (for example the position in the global coordinate system) of each vehicle 70 to be assisted based on the vehicle information (information based on radio waves) sent from each vehicle 70 to be assisted at certain intervals, generates the transmit data including the vehicle position information of the vehicle 70 to be assisted, and sends the generated transmit data to the vehicle 70 to be assisted.

In such a case, each vehicle 70 to be assisted located in the coverage area covered by the communication antenna 12A can acquire the vehicle position information (the own position information) sent from the information processing system 1A at certain intervals. And, each vehicle 70 to be assisted can maintain the self-driving function based on the vehicle position information sent from the information processing system 1A.

Embodiment 2

Figure 5:
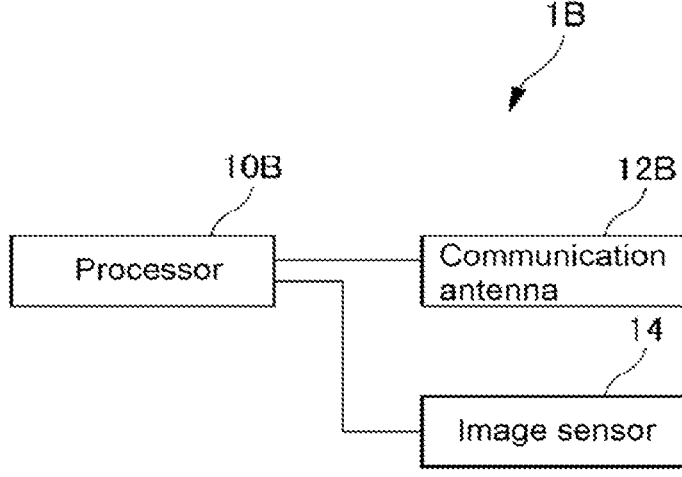
FIG. 5 is a schematic view illustrating the constitution of an information processing system according to embodiment 2.
Figure 6:
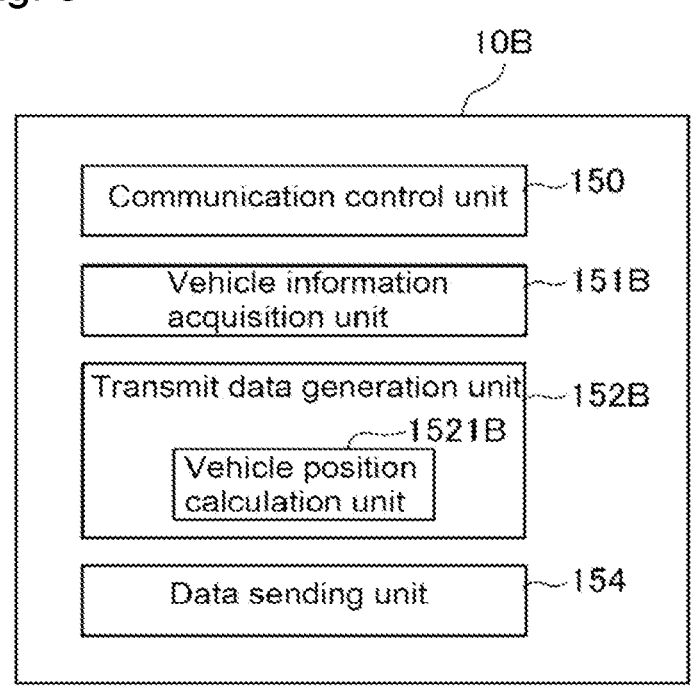
FIG. 6 is a schematic view illustrating functions of an information processing system according to embodiment 2.
Figure 7:
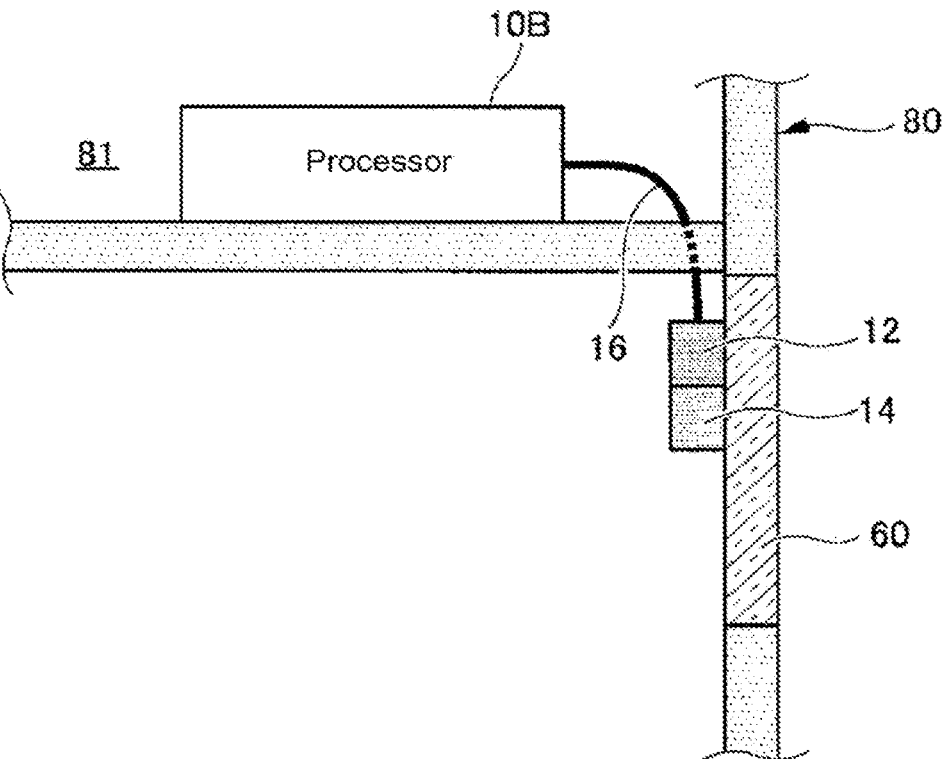
FIG. 7 is a cross sectional view schematically illustrating an example of disposition of an information processing system in a building.

FIG. 5 is a schematic view illustrating the constitution of an information processing system 1B according to embodiment 2. FIG. 6 is a schematic view illustrating functions of the information processing system 1B. FIG. 7 is a cross-sectional view schematically illustrating an example of disposition of the information processing system 1B in a building 80.

The information processing system 1B has a processor 10B as an example of the above processor 10, a communication antenna 12B as an example of the above communication antenna 12, and an image sensor 14.

The communication antenna 12B may be in the form of an array antenna, like the above communication antenna 12A.

The image sensor 14 is installed preferably on a building 80, like the communication antenna 12B. The image sensor 14 is installed so that its imaging region includes the coverage area covered by the communication antenna 12B. The image sensor 14 may be realized by a plurality of image sensors 14 like a stereo camera. The image sensor 14 is installed preferably on the building 80 having the communication antenna 12B installed, at a height of from 3 m to 15 m from the ground. In such a case, the image sensor 14 may be installed preferably on a window glass 60 as attached to the communication antenna 12B, as shown in FIG. 7. For example, the lens and/or the image element of the image sensor 14 may be attached to the communication antenna 12B. In the example shown in FIG. 7, the processor 10B is installed in a space 81 at the ceiling and is electrically connected to the image sensor 14 and the communication antenna 12B via wiring 16. In FIG. 7, the wiring 16 is schematically illustrated as one wiring, however, the wiring 16 is separately installed for the image sensor 14 and for the communication antenna 12B. Further, the image sensor 14 may be installed at a different position from the communication antenna 12B. The image sensor 14 may be installed at a position different from a position where the communication antenna 12B is installed, on the window glass 60, or may be installed on a sash to which the window glass 60 is attached. In a case where the image sensor 14 is installed at a position different from the communication antenna 12B, the sensor information may be sent by radio communication. The image sensor 14 and the communication antenna 12B may be installed on the same building or may be installed on different buildings.

In a case where the conductor constituting the communication antenna 12B is installed on a glass plate, even in a case where the building has a height of more than 15 m from the ground, the communication antenna 12B and the image sensor 14 can be installed at a height of from 3 m to 15 m from the ground, and as compared with a case where they are installed at a position higher than 15 m, the coverage area and the detection area can be set in detail, the traffic can be dispersed, and the load on the processor 10B can thereby be reduced.

The image sensor 14 generates an image data of the coverage area covered by the communication antenna 12B at a predetermined frame rate, and supplies the image data to the processor 10B.

The processor 10B has, as shown in FIG. 6, a communication control unit 150, a vehicle information acquisition unit 151B, a transmit data generation unit 152B and a data sending unit 154.

The vehicle information acquisition unit 151B acquires vehicle information relating to a plurality of vehicles to be assisted located in the coverage area covered by the communication antenna 12B.

According to the embodiment 2, the vehicle information is sensor information (image data) generated by the image sensor 14.

The transmit data generation unit 152B generates transmit data for each vehicle to be assisted, based on vehicle information acquired by the vehicle information acquisition unit 151B.

According to the embodiment 2, the transmit data generation unit 152B includes a vehicle position calculation unit 1521B, and the transmit data generated by the transmit data generation unit 152B includes the vehicle position information of each vehicle 70 to be assisted.

The vehicle position calculation unit 1521B calculates the vehicle position of each vehicle 70 to be assisted based on vehicle information (sensor information generated by the image sensor 14) of each vehicle 70 to be assisted acquired by the vehicle information acquisition unit 151B. The method of calculating the position of the vehicle 70 to be assisted based on the image data of the vehicle 70 to be assisted, as an object of which the position is to be calculated, is optional, and for example, a distance measuring method employing parallax by a stereo camera may be employed. In such a case, the distance between each image sensor 14 and the vehicle 70 to be assisted is calculated, and based on the results of calculation of the distances and the position information of the image sensor 14, the position (for example, position in the global coordinate system) of the vehicle 70 to be assisted may be calculated e.g. by the principle of triangulation. For example, the vehicle position calculation unit 1521B may calculate the position of the vehicle to be assisted with accuracy with an error within 2 m, preferably within 50 cm, more preferably within 5 cm.

In such a manner, according to the embodiment 2, the information processing system 1B calculates the position of each vehicle 70 to be assisted based on vehicle information (image data capturing the vehicle 70 to be assisted) acquired by the image sensor 14 at predetermined intervals corresponding to the frame rate of the image sensor 14, generates transmit data including the vehicle position information of each vehicle 70 to be assisted, and sends the generated transmit data to each vehicle 70 to be assisted.

In such a case, each vehicle 70 to be assisted, located in the coverage area covered by the communication antenna 12B, can obtain the vehicle position information (the own position information) sent from the information processing system 1B at predetermined intervals. And, each vehicle 70 to be assisted can maintain the self-driving function based on the vehicle position information sent from the information processing system 1B.

According to the embodiment 2 also, the vehicle position calculation unit 1521 described for the above embodiment 1 may be installed. In such a case, the final vehicle position information may be lead from the calculation results by the vehicle position calculation unit 1521 described for the above embodiment 1 and the calculation results by the vehicle position calculation unit 1521B. Otherwise, one of the calculation results by the vehicle position calculation unit 1521 described for the above embodiment 1 and the calculation results by the vehicle position calculation unit 1521B may be utilized as the redundant system.

By the way, according to the embodiment 2, the sensor information from the image sensor 14 is utilized to generate the vehicle position information of each vehicle 70 to be assisted, and the sensor information from the image sensor 14 may be suitably utilized for other applications. For example, the sensor information from the image sensor 14 can be utilized for renewal of map data. This is because when a road is constructed/abolished/changed (including e.g. widening), such a change of the road can be detected based on the sensor information from the image sensor 14. In such a case, the transmit data including road information reflecting the change of the road may be generated by the transmit data generation unit 152B and sent to each vehicle 70 to be assisted by the data sending unit 154. In such a case, in the processor mounted in the vehicle 70 to be assisted, the map information displayed can be updated, and the self-driving function can be realized based on the latest map information. Further, the sensor information from the image sensor 14 may be utilized as information necessary for digital twin computing. Digital twin computing is technology such that actual equipment or facility is converted to digital data, and the digital twin generated in virtual space is analyzed and predicted, and fed back to the real world. For example, in a data processing unit 10, utilizing the map information and the vehicle position information in virtual space, simulation of vehicles may be carried out. By using the sensor information from the image sensor 14, the map information in virtual space can always be updated. Further, in addition to the map information, weather or road conditions are digitized, and digital twin is generated in virtual space, whereby more accurate simulation will become possible. By generating transmit data for vehicle control based on simulation information by digital twin computing and sending the transmit data to the vehicle 70 to be assisted, the vehicle in real space can be controlled in conjunction with the simulation in virtual space. Here, the sensor information is transmitted to the data processing unit 10 preferably with low latency. As a means to improve low latency, wire connection and wireless connection with the data processing unit 10 may be mentioned, and in the case of wireless connection, low latency can be realized by utilizing 5G.

Further, the sensor information may be obtained, in addition to from the image sensor 14, from a temperature sensor, a raindrop sensor, a pressure sensor, a millimeter wave radar, a radar sensor, an illuminance sensor, or the like. The temperature sensor detects the temperature on the road surface. The raindrop sensor detects the amount of rainfall and wettability of the road surface. The pressure sensor detects the wind speed and the wind direction. The radar sensor detects obstacles. The illuminance sensor detects the illuminance outside a building. By generating digital twin using such sensor information, control information necessary for self-driving can be obtained.

Embodiment 3

Figures 8, 9:
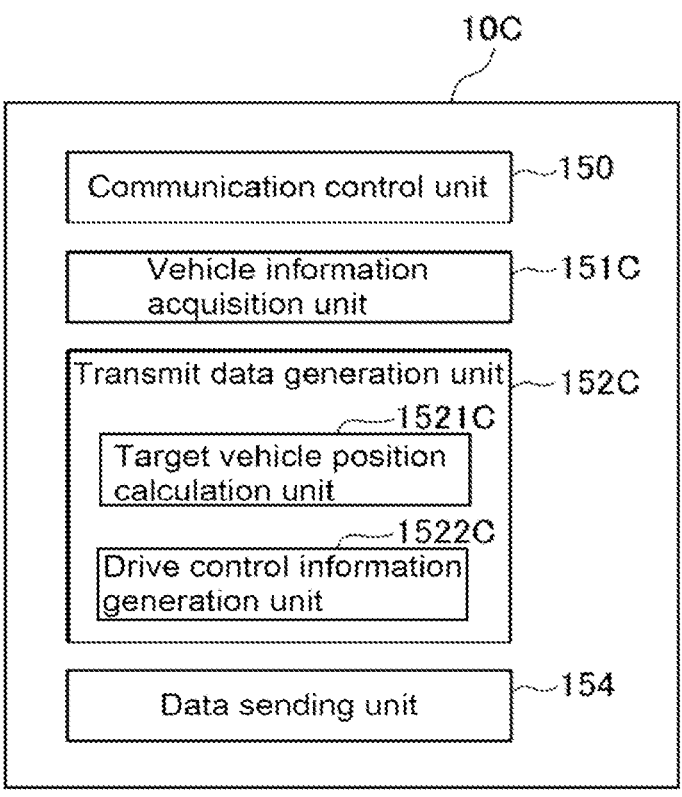
FIG. 8 is a schematic view illustrating the constitution of an information processing system according to embodiment 3.
FIG. 9 is a schematic view illustrating functions of an information processing system according to embodiment 3.

FIG. 8 is a schematic view illustrating the constitution of an information processing system 1C according to embodiment 3. FIG. 9 is a schematic view illustrating functions of the information processing system 1C.

The information processing system 1C has a processor 10C as an example of the above processor 10 and a communication antenna 12C as an example of the above communication antenna 12.

The communication antenna 12C may have an antenna to receive the after-described image data from the vehicle 70 to be assisted and an antenna to send the transmit data to the vehicle 70 to be assisted separately, or may have an integrated antenna having these functions. Further, the communication antenna 12C may be in the form of an array antenna, like the above communication antenna 12A.

The processor 10C has, as shown in FIG. 9, a communication control unit 150, a vehicle information acquisition unit 151C, a transmit data generation unit 152C and a data sending unit 154.

The vehicle information acquisition unit 151C acquires vehicle information relating to a plurality of vehicles to be assisted located in the coverage area covered by the communication antenna 12C via communication established by the communication control unit 150 (communication with each vehicle 70 to be assisted).

According to the embodiment 3, vehicle information is sensor information (image data) generated by the image sensor 214 (see FIG. 2) mounted in the vehicle 70 to be assisted. The image sensor 214 is, for example, in the form of a camera which makes images of the surrounding environment of the vehicle 70 to be assisted. The image sensor 214 may be capable of making images of the surrounding environment not only ahead but also behind or on the side of the vehicle 70 to be assisted, that is in a plurality of directions (for example, a plurality of image sensors 214 may be used).

In such a manner, the vehicle information acquisition unit 151C can acquire the surrounding environment information (image data) captured by the image sensor 214, from the image sensor 214 mounted in each vehicle 70 to be assisted. Such surrounding environment information may include information relating to relative positional relation of each vehicle 70 to be assisted, obstacles and pedestrians, as the surrounding environment. Thus, even under conditions where a relatively large number of vehicles 70 to be assisted and the like are present in the coverage area covered by the communication antenna 12C, information in detail can be obtained over the entire coverage area covered by the communication antenna 12C. In other words, the more the vehicles 70 to be assisted are present in the coverage area covered by the communication antenna 12C, the more precise surrounding environment information will be obtained over the entire coverage area covered by the communication antenna 12C. As a result, the reliability of the drive control information of each vehicle 70 to be assisted as described hereinafter will effectively be increased.

The transmit data generation unit 152C generates transmit data for each vehicle to be assisted based on surrounding environment information acquired by the vehicle information acquisition unit 151C.

According to the embodiment 3, the transmit data generation unit 152C has a target vehicle position calculation unit 1521C and a drive control information generation unit 1522C, and the transmit data generated by the transmit data generation unit 152C includes the drive control information for each vehicle 70 to be assisted.

The target vehicle position calculation unit 1521C calculates the target vehicle position of each vehicle 70 to be assisted based on surrounding environment information (surrounding environment information generated by the image sensor 214) of each vehicle 70 to be assisted acquired by the vehicle information acquisition unit 151C. The target vehicle position of each vehicle 70 to be assisted is calculated so that no close contact of the respective vehicles 70 to be assisted, nor close contact with other obstacles or pedestrians occurs. For example, the target vehicle positions are calculated for the respective vehicles 70 to be assisted so that the respective vehicles 70 to be assisted can pass the coverage area covered by the communication antenna 12C in the shortest time while they keep appropriate distances with each other. In such a manner, the target vehicle position calculation unit 1521C calculates the target vehicle position of each vehicle 70 to be assisted to be realized in the next process cycle, at predetermined intervals corresponding to the update cycle of the image data acquired form the image sensor 214.

The drive control information generation unit 1522C generates the drive control information so that each vehicle 70 to be assisted arrives at the target vehicle position calculated by the target vehicle position calculation unit 1521C for each vehicle 70 to be assisted. The drive control information may include a target value relating to at least one drive parameter among the velocity, the acceleration, the deceleration and the steering angle (travelling direction) of the vehicle to be assisted. For example, the drive control information may include indicated values indicating the target acceleration and the target travelling direction of the vehicle 70 to be assisted.

In such a manner, according to the embodiment 3, the information processing system 1C generates the drive control information of each vehicle 70 to be assisted based on vehicle information (image data capturing the surrounding environment of the vehicle 70 to be assisted) acquired by the image sensor 214 at predetermined intervals corresponding to the frame rate of the image sensor 214 mounted in the vehicle 70 to be assisted, generates the transmit data including the drive control information of each vehicle 70 to be assisted, and sends the generated transmit data to each vehicle 70 to be assisted.

In such a case, each vehicle 70 to be assisted, located in the coverage area covered by the communication antenna 12C, can obtain the drive control information sent from the information processing system 1C at predetermined intervals. And, each vehicle 70 to be assisted can maintain the self-driving function based on the drive control information sent from the information processing system 1C.

According to the embodiment 3, the vehicle information acquisition unit 151C acquires the surrounding environment information (image data) captured by the image sensor 214, from the image sensor 214 mounted in each vehicle 70 to be assisted, as vehicle information, and the information to be acquired is not limited to the surrounding environment information (image data) captured by the image sensor 214. For example, the vehicle information acquisition unit 151C may acquire surrounding environment information (image data) from another surrounding environment monitoring sensor which may be mounted in each vehicle 70 to be assisted, as vehicle information. Another surrounding environment monitoring sensor may include an ultrasonic sensor, and a radar sensor such as a millimeter wave radar sensor and LiDAR (Light Detection And Ranging).

According to the embodiment 3 also, in the same manner as in the above embodiment 1 or the embodiment 2, the transmit data generation unit 152C may further have a vehicle position calculation unit 1521 or 1521B. In such a case, the target vehicle position calculation unit 1521C may calculate the target vehicle position of the vehicle 70 to be assisted based on the vehicle position information calculated by the vehicle position calculation unit 1521 or 1521B for each vehicle 70 to be assisted, and surrounding environment information (surrounding environment information generated by the image sensor 14) acquired by the vehicle information acquisition unit 151B.

Further, in the embodiment 3, the drive control information may include, in addition to the above target value relating to the drive parameter, at least one of information relating to the road environment around the vehicle 70 to be assisted (for example, ahead, behind or on the side of the vehicle), and pedestrian information around the vehicle to be assisted (for example, ahead, behind or on the side of the vehicle). In such a case, the information relating to the road environment may include position information of obstacles such as a parking vehicle, a falling object, a road construction, etc., on a road 90 located in the coverage area. In such a case, each vehicle 70 to be assisted can maintain the self-driving function to avoid close contact with other obstacles or pedestrians, based on the drive control information sent from the information processing system 1C.

Embodiment 4

Figure 10:
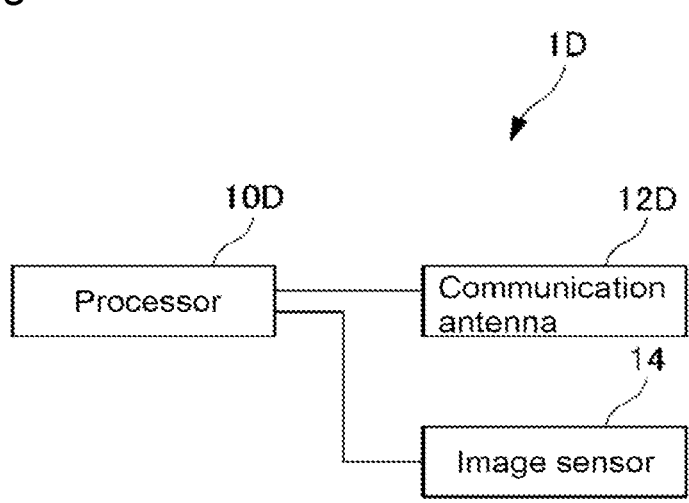
FIG. 10 is a schematic view illustrating the constitution of an information processing system according to embodiment 4.
Figure 11:
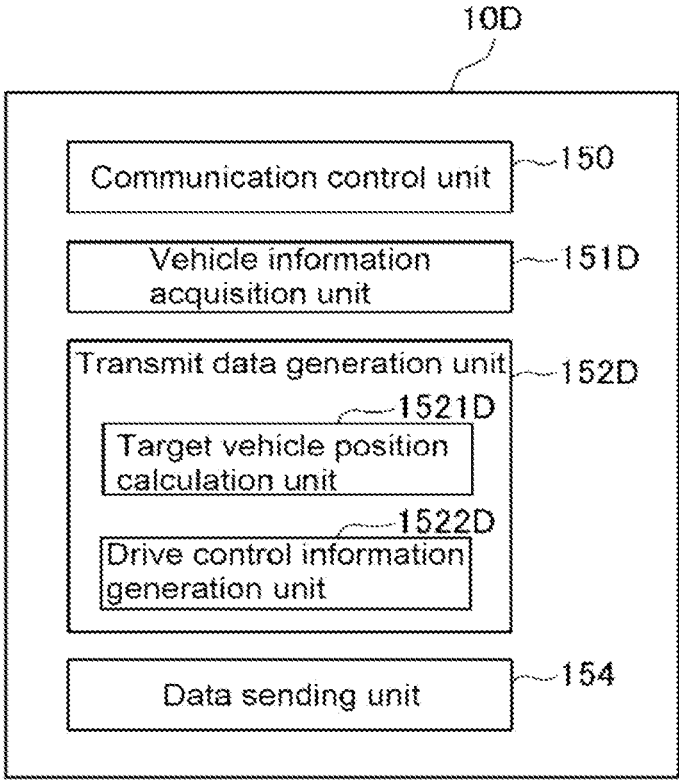
FIG. 11 is a schematic view illustrating functions of an information processing system according to embodiment 4.

FIG. 10 is a schematic view illustrating the constitution of an information processing system 1D according to embodiment 4. FIG. 11 is a schematic view illustrating functions of the information processing system 1D.

The information processing system 1D has a processor 10D as an example of the above processor 10, a communication antenna 12D as an example of the above communication antenna 12, and an image sensor 14.

The communication antenna 12D may be in the form of an array antenna, like the above communication antenna 12A.

The processor 10D has, as shown in FIG. 11, a communication control unit 150, a vehicle information acquisition unit 151D, a transmit data generation unit 152D and a data sending unit 154.

The vehicle information acquisition unit 151D acquires vehicle information relating to a plurality of vehicles to be assisted located in the coverage area covered by the communication antenna 12D.

According to the embodiment 4, vehicle information is sensor information (image data) generated by the above image sensor 14. The image sensor 14 is, for example, installed to make images of the surrounding environment of the vehicle 70 to be assisted. As described above, a plurality of image sensors 14 may be installed in one coverage area.

The transmit data generation unit 152D generates transmit data for each vehicle to be assisted based on vehicle information acquired by the vehicle information acquisition unit 151D.

According to the embodiment 4, the transmit data generation unit 152D has a target vehicle position calculation unit 1521D and a drive control information generation unit 1522D, and the transmit data generated by the transmit data generation unit 152D includes drive control information for each vehicle 70 to be assisted.

The target vehicle position calculation unit 1521D calculates the target vehicle position of each vehicle 70 to be assisted based on sensor information (image data generated by the image sensor 14) of each vehicle 70 to be assisted acquired by the vehicle information acquisition unit 151D. The method of calculating the target vehicle position of each vehicle 70 to be assisted may be the same as in the above described embodiment 3. In embodiment 4, image data having the coverage area viewed from above by the image sensor 14 can be obtained, and thus the target vehicle position of each vehicle 70 to be assisted can be calculated more appropriately.

The drive control information generation unit 1522D generates the drive control information so that each vehicle 70 to be assisted arrives at the target vehicle position calculated by the target vehicle position calculation unit 1521D for each vehicle 70 to be assisted. The drive control information may include a target value relating to at least one drive parameter among the velocity, the acceleration, the deceleration and the steering angle (travelling direction) of the vehicle to be assisted. In such a manner, according to the embodiment 4, the information processing system 1D generates the drive control information for each vehicle 70 to be assisted based on vehicle information (image data capturing the surrounding environment of the vehicle 70 to be assisted) acquired by the image sensor 14 at predetermined intervals corresponding to the frame rate of the image sensor 14 on the roadside, generates transmit data including the drive control information for each vehicle 70 to be assisted, and sends the generated transmit data to each vehicle 70 to be assisted.

In such a case, each vehicle 70 to be assisted, located in the coverage area covered by the communication antenna 12D, can obtain the drive control information sent from the information processing system 1D at predetermined intervals. And, each vehicle 70 to be assisted can maintain the self-driving function based on the drive control information sent from the information processing system 1D.

According to the embodiment 4 also, in the same manner as in the above embodiment 1 or the embodiment 2, the transmit data generation unit 152D may further have a vehicle position calculation unit 1521 or 1521B. In such a case, the target vehicle position calculation unit 1521D may calculate the target vehicle position of the vehicle 70 to be assisted based on the vehicle position information calculated by the vehicle position calculation unit 1521 or 1521B for each vehicle 70 to be assisted, and sensor information (image data generated by the image sensor 14) acquired by the vehicle information acquisition unit 151B.

In the embodiment 4, the sensor information from the image sensor 14 on the roadside is utilized, and in addition, surrounding environment information (image data) captured by the image sensor 214 may also be utilized as in the above embodiment 3. That is, in the embodiment 4 also, the processor 10D may further have a vehicle information acquisition unit 151C and a transmit data generation unit 152C according to the embodiment 3. In such a case, the final target vehicle position may be determined based on the target vehicle position of the vehicle 70 to be assisted calculated by the target vehicle position calculation unit 1521D and the target vehicle position of the vehicle 70 to be assisted calculated by the target vehicle position calculation unit 1521C of the transmit data generation unit 152C. Otherwise, one of the target vehicle position of the vehicle 70 to be assisted calculated by the target vehicle position calculation unit 1521D, and the target vehicle position of the vehicle 70 to be assisted calculated by the target vehicle position calculation unit 1521C of the transmit data generation unit 152C, may be utilized as the redundant system.

Further, in the embodiment 4, the drive control information may include, in addition to the above target value relating to the drive parameter, at least one of information relating to the road environment around the vehicle 70 to be assisted (for example, ahead, behind or on the side of the vehicle), and pedestrian information around the vehicle to be assisted (for example, ahead, behind or on the side of the vehicle). In such a case, the information relating to the road environment may include position information of obstacles such as a parking vehicle, a falling object, a road construction, etc., on a road 90 located in the coverage area. In such a case, each vehicle 70 to be assisted can maintain the self-driving function to avoid close contact with obstacles or pedestrians, based on the drive control information sent from the information processing system 1D.

Embodiment 5

Figure 12:
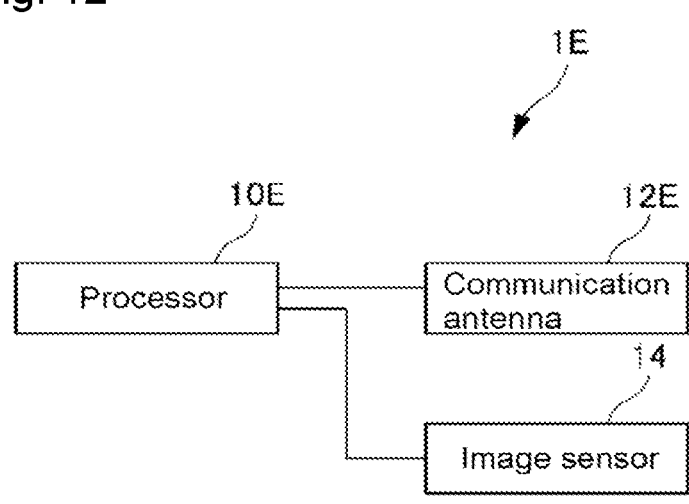
FIG. 12 is a schematic view illustrating the constitution of an information processing system according to embodiment 5.
Figure 13:
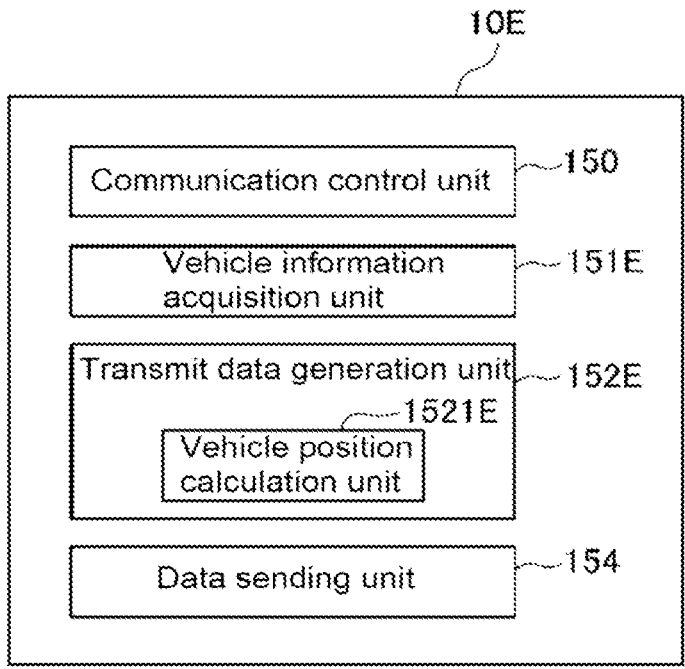
FIG. 13 is a schematic view illustrating functions of an information processing system according to embodiment 5.
Figure 14:
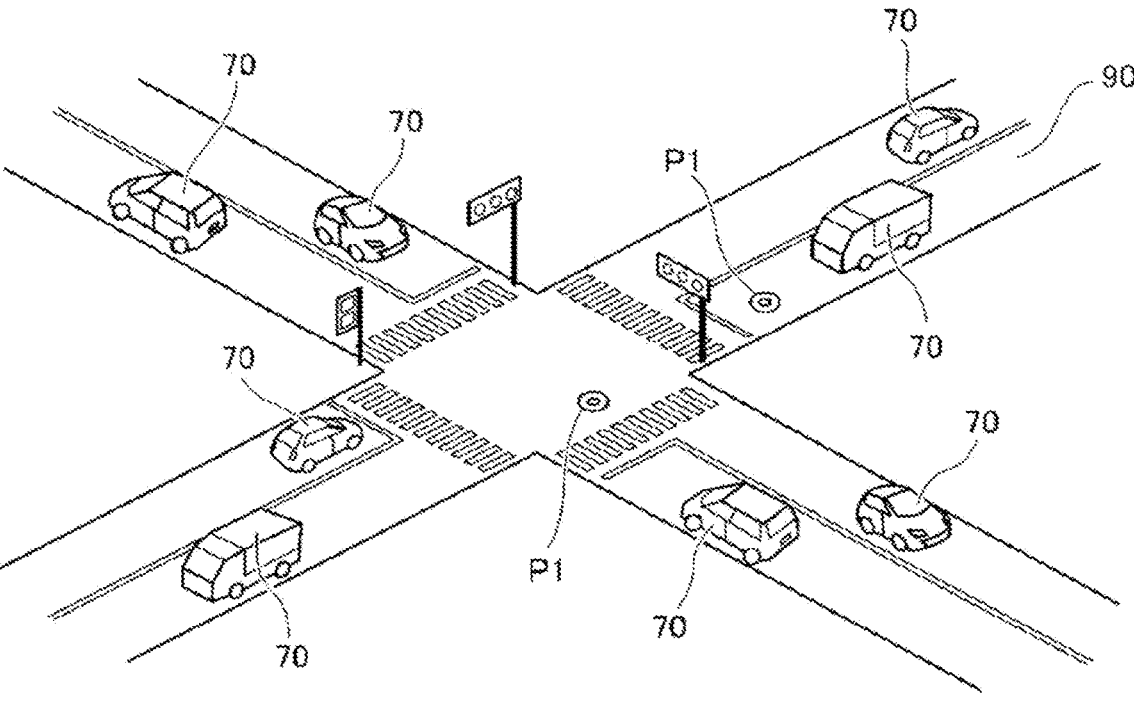
FIG. 14 is a diagram illustrating a predetermined position.

FIG. 12 is a schematic view illustrating the constitution of an information processing system 1E according to embodiment 5. FIG. 13 is a schematic view illustrating functions of the information processing system 1E. FIG. 14 is a diagram illustrating a predetermined position.

The information processing system 1E has a processor 10E as an example of the above processor 10, a communication antenna 12E as an example of the above communication antenna 12, and an image sensor 14.

The communication antenna 12E may be in the form of an array antenna, like the above communication antenna 12A.

The processor 10E has, as shown in FIG. 13, a communication control unit 150, a vehicle information acquisition unit 151E, a transmit data generation unit 152E and a data sending unit 154.

The vehicle information acquisition unit 151E acquires vehicle information relating to a plurality of vehicles to be assisted located in the coverage area covered by the communication antenna 12E.

According to the embodiment 5, vehicle information is sensor information (image data) generated by the above image sensor 14.

The transmit data generation unit 152E generates transmit data for each vehicle to be assisted based on vehicle information acquired by the vehicle information acquisition unit 151E.

According to the embodiment 5, the transmit data generation unit 152E has a vehicle position calculation unit 1521E, and the transmit data generated by the transmit data generation unit 152E includes vehicle position information of each vehicle 70 to be assisted.

The vehicle position calculation unit 1521E calculates the position of each vehicle 70 to be assisted based on sensor information generated by the image sensor 14 and known position information relating to a predetermined position on a road 90. The predetermined position may be set on the road 90 in the coverage area covered by the communication antenna 12E. The predetermined position is preferably a position where each vehicle 70 to be assisted may pass, and a plurality of such positions may be set. In FIG. 14, two predetermined positions P1 are shown as an example. The predetermined position P1 may be an image-recognizable specific position on the road 90. For example, the predetermined position P1 may be e.g. a corner position or a center position of a traffic sign board on the road 90. Otherwise, the predetermined position P1 may be a position corresponding to a predetermined pixel area (for example the center) of an image of the image sensor 14. In such a case, the predetermined position P1 may be an optional position on the road 90.

The vehicle position calculation unit 1521E calculates the position of the vehicle 70 to be assisted based on the positional relation between the predetermined position and the vehicle 70 to be assisted in the image obtained by the image sensor 14, for each vehicle 70 to be assisted. Specifically, the vehicle position calculation unit 1521E calculates the relative position of the vehicle 70 to be assisted relative to the predetermined position, based on the positional relation between the predetermined position and the vehicle 70 to be assisted in the image obtained by the image sensor 14. And, the vehicle position calculation unit 1521E calculates the position (for example, the position in the global coordinate system) of the vehicle 70 to be assisted, based on the relative position of the vehicle 70 to be assisted relative to the predetermined position and the known position information relating to the predetermined position. For example, the vehicle position calculation unit 1521E calculates the position of the vehicle to be assisted with accuracy with an error within 2 m, preferably within 50 cm, more preferably within 5 cm.

In such a manner, according to the embodiment 5, the information processing system 1E calculates the position of each vehicle 70 to be assisted based on vehicle information (image data capturing the vehicle 70 to be assisted) acquired by the image sensor 14 at predetermined intervals corresponding to the frame rate of the image sensor 14, generates transmit data including vehicle position information of each vehicle 70 to be assisted, and sends the generated transmit data to each vehicle 70 to be assisted.

In such a case, each vehicle 70 to be assisted, located in the coverage area covered by the communication antenna 12E, can obtain the vehicle position information (the own position information) sent from the information processing system 1E at predetermined intervals. And, each vehicle 70 to be assisted can maintain the self-driving function based on the vehicle position information sent from the information processing system 1E.

In the embodiment 5, the sensor information from the image sensor 14 on the roadside is utilized, and instead, or in addition, the surrounding environment information (image data) captured by the image sensor 214 may also be utilized as in the above embodiment 3.

In the embodiment 5 also, the vehicle position calculation unit 1521 described for the above embodiment 1 may be installed. In such a case, the final vehicle position information may be lead based on the calculation results by the vehicle position calculation unit 1521 described for the above embodiment 1 and the calculation results by the vehicle position calculation unit 1521E.

Embodiment 6

Figure 15:
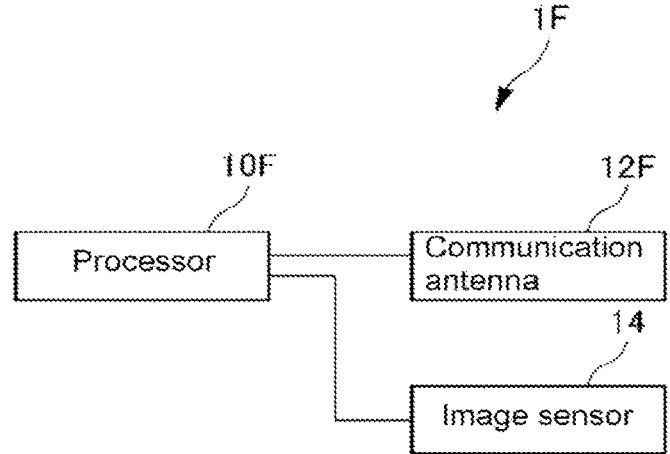
FIG. 15 is a schematic view illustrating the constitution of an information processing system according to embodiment 6.
Figure 16:
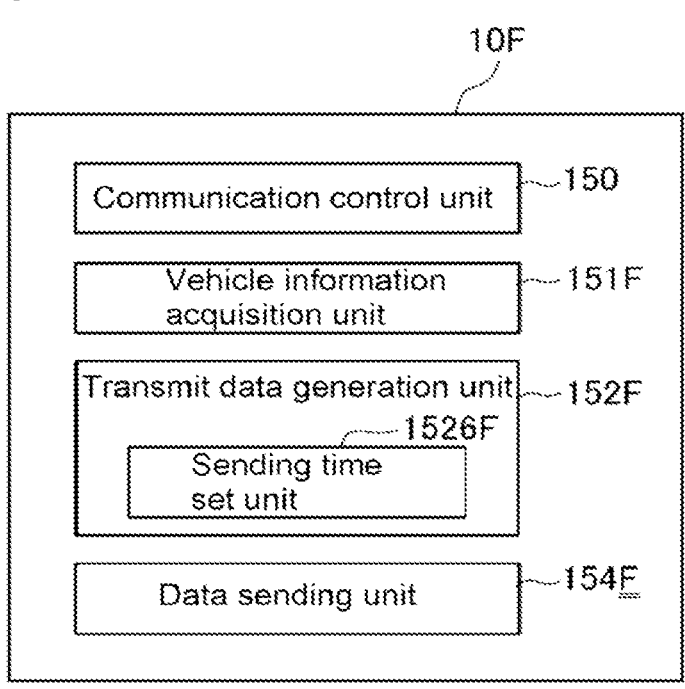
FIG. 16 is a schematic view illustrating functions of an information processing system according to embodiment 6.

FIG. 15 is a schematic view illustrating the constitution of an information processing system 1F according to embodiment 6. FIG. 16 is a schematic view illustrating functions of the information processing system 1F.

The information processing system 1F has a processor 10F as an example of the above processor 10, a communication antenna 12F as an example of the above communication antenna 12, and an image sensor 14.

The communication antenna 12F may be in the form of an array antenna, like the above communication antenna 12A.

The processor 10F has, as shown in FIG. 16, a communication control unit 150, a vehicle information acquisition unit 151F, a transmit data generation unit 152F and a data sending unit 154F.

The vehicle information acquisition unit 151F acquires vehicle information relating to a plurality of vehicles to be assisted located in the coverage area covered by the communication antenna 12F.

According to the embodiment 6, the vehicle information is sensor information (image data) generated by the above image sensor 14.

The transmit data generation unit 152F generates transmit data for each vehicle to be assisted, based on vehicle information acquired by the vehicle information acquisition unit 151F.

According to the embodiment 6, the transmit data generation unit 152F has a sending time setting unit 1526F, and the transmit data generated by the transmit data generation unit 152F includes vehicle position information of each vehicle 70 to be assisted. And, according to the embodiment 6, the vehicle position information of each vehicle 70 to be assisted is known position information (for example, position information in the global coordinate system) relating a predetermined position on a road 90. The predetermined position may be the same as the predetermined position as described for the above embodiment 5 (see predetermined positions P1 in FIG. 14).

The sending time setting unit 1526F sets, for each vehicle 70 to be assisted, the time when the vehicle to be assisted is located on the predetermined position, as the transmit data sending time. For example, the sending time setting unit 1526F calculates the relative distance of the vehicle 70 to be assisted from the predetermined position, based on the positional relation between the predetermined position and the vehicle 70 to be assisted on the image obtained by the image sensor 14. And, the sending time setting unit 1526F predicts the time when the relative distance becomes 0, based on the rate of change of the relative distance at each process cycle, and the time may be set as the transmit data sending time. Otherwise, the sending time setting unit 1526F may predict the time before a predetermined time ΔT relative to the time when the relative distance becomes 0, based on the rate of change of the relative distance at each process cycle, and set the time as the transmit data sending time. In such a case, the predetermined time ΔT may correspond to a minute time considering the time from when the transmit data is generated to when the transmit date is sent to the vehicle 70 to be assisted and received by the vehicle 70 to be assisted and processed.

The data sending unit 154F sends the transmit data generated by the transmit data generation unit 152 to the vehicle 70 to be assisted, via communication established by the communication control unit 150 (communication with each vehicle 70 to be assisted), at the sending time set by the sending time setting unit 1526F for each vehicle 70 to be assisted.

In such a manner, in the embodiment 6, the information processing system 1F calculates the time when the vehicle 70 to be assisted is located on the predetermined position, based on the sensor information (image data) generated by the image sensor 14 for each vehicle 70 to be assisted, and sends the transmit data including the known position information relating to the predetermined position, to each vehicle 70 to be assisted, at a sending time in accordance with the above calculated time.

In such a case, each vehicle 70 to be assisted located in the coverage area covered by the communication antenna 12A can obtain vehicle position information (the own position information) sent from the information processing system 1F every time it passes the predetermined position. And, each vehicle 70 to be assisted can maintain the self-driving function based on the vehicle position information sent from the information processing system 1F. In such a case, by properly setting the number (intervals) of the predetermined positions, the vehicle position information can be continuously supplied to each vehicle 70 to be assisted, and the self-driving function can stably be maintained.

In the embodiment 6 also, the vehicle position calculation unit 1521 described for the above embodiment 1 may be installed. In such as case, while the vehicle 70 to be assisted is not located on the predetermined position, vehicle position information based on the calculation results by the vehicle position calculation unit 1521 may be sent to each vehicle 70 to be assisted.

Further, in the embodiment 6, the sensor information from the image sensor 14 on the roadside is utilized, and instead or in addition, the surrounding environment information (image data) captured by the image sensor 214 may be utilized as in the above embodiment 3. That is, the sending time setting unit 1526F may calculate the time when the vehicle to be assisted is located on the predetermined position, based on the sensor information from the image sensor 14 on the roadside and/or surrounding environment information captured by the image sensor 214. The sending time may be properly set based on various kinds of sensor information obtained by e.g. the pressure sensor or the temperature sensor.

The present embodiments have been described in detail, however, it should be understood that the present invention is not limited to specific embodiments, and various changes and modifications are possible without departing from the intention and the scope of the present invention. Further, all of or some of the constituents of the embodiments described above may be combined.

REFERENCE SYMBOLS 1 (1A to 1F): information processing system
10 (10A to 10F): processor
12 (12A to 12F): communication antenna
14: image sensor
16: wiring
60: window glass
70: vehicle to be assisted
80: building
90: road
150: communication control unit
151, 151B, 151C, 151D, 151E, 151F: vehicle information acquisition unit
152, 152B, 152C, 152D, 152E, 152F: transmit data generation unit
1521, 1521B, 1521E: vehicle position calculation unit
1521C, 1521D: target vehicle position calculation unit
1522C, 1522D: drive control information generation unit
1526F: sending time setting unit
154, 154F: data sending unit
212: in-vehicle antenna
214: image sensor

What is claimed is:

1. An information processing system to assist a vehicle to be assisted having a self-driving function in driving, which comprises:
   a roadside information processor installed on a roadside, and
   a communication antenna installed on the roadside,
   wherein the roadside information processor comprises:
      a vehicle information acquisition unit to acquire vehicle information relating to one or more vehicles to be assisted located in a coverage area covered by the communication antenna,
      a transmit data generation unit to generate transmit data based on the vehicle information acquired by the vehicle information acquisition unit, and
      a data sending unit to send the transmit data generated by the transmit data generation unit to a processor of the vehicle to be assisted via the communication antenna,
   the transmit data includes vehicle position information indicating a position of the vehicle to be assisted, and drive control information,
   the drive control information includes a target value relating to at least one of a velocity, an acceleration, a deceleration and a steering angle of the vehicle to be assisted,
   the transmit data is transmitted at a predicted time based on an estimated arrival time of the vehicle at a predetermined road position so that the vehicle to be assisted performs self-driving based on the vehicle position information and the drive control information generated by or sent from the roadside information processor, and
   the estimated arrival time of the vehicle is calculated based on a rate of change of an relative distance at each process cycle.

2. The information processing system according to claim 1, wherein the roadside information processor and the communication antenna are installed in/on a building.

3. The information processing system according to claim 2, wherein the roadside information processor and the communication antenna are installed inside the building.

4. The information processing system according to claim 2, wherein the communication antenna is installed on a window glass of the building.

5. The information processing system according to claim 4, wherein the communication antenna is installed on an interior side of the window glass of the building.

6. The information processing system according to claim 2, wherein the building has a living space including an office, a residence or a hotel.

7. The information processing system according to claim 1, wherein a plurality of the communication antennas is installed,
   the vehicle information includes information based on radio waves sent from an in-vehicle antenna mounted in the vehicle to be assisted,
   the vehicle information acquisition unit acquires information based on the radio waves from the vehicle to be assisted via the plurality of the communication antennas, and
   the transmit data generation unit calculates the position of the vehicle to be assisted, based on the information based on the radio waves from the vehicle to be assisted acquired via the plurality of the communication antennas, and known position information relating to the plurality of the communication antennas.

8. The information processing system according to claim 7, wherein the transmit data generation unit calculates the position of the vehicle to be assisted with accuracy with an error within 2 meters.

9. The information processing system according to claim 1, which further has an image sensor which makes images of the vehicle to be assisted, installed on the roadside, and
   wherein the vehicle information includes sensor information generated by the image sensor,
   the vehicle information acquisition unit acquires the sensor information from the image sensor, and
   the transmit data generation unit generates the transmit data based on the sensor information.

10. The information processing system according to claim 9, wherein the transmit data generation unit generates the drive control information based on the sensor information.

11. The information processing system according to claim 9, wherein the drive control information includes at least one of information relating to road environment around the vehicle to be assisted, and pedestrian information around the vehicle to be assisted.

12. The information processing system according to claim 9, wherein the image sensor is installed together with the roadside information processor and the communication antenna in a same building at a height of from 3 meters to 15 meters from the ground.

13. The information processing system according to claim 12, wherein the image sensor is attached to the communication antenna.

14. The information processing system according to claim 9, wherein the transmit data generation unit calculates the position of the vehicle to be assisted based on the sensor information and known position information relating to the predetermined road position.

15. The information processing system according to claim 14, wherein the transmit data includes the known position information relating to the predetermined position as the vehicle position information, and
   the data sending unit sends the transmit data, in accordance with a time when the vehicle to be assisted is assumed to be located on the predetermined position.

16. The information processing system according to claim 9, wherein the image sensor is installed inside a building.

17. The information processing system according to claim 9, wherein the communication antenna is provided on a window glass of a building, and
   the image sensor is provided on the window glass on which the communication antenna is provided or on a sash to which the window glass is attached.

18. The information processing system according to claim 1, wherein the vehicle information includes surrounding environment information of the vehicle to be assisted based on the results detected by an in-vehicle sensor mounted in the vehicle to be assisted,
   the vehicle information acquisition unit receives the surrounding environment information from the vehicle to be assisted via the communication antenna, and
   the transmit data generation unit generates the transmit data based on the surrounding environment information.

19. The information processing system according to claim 18, wherein the in-vehicle sensor includes at least one of an image sensor and a radar sensor.

20. The information processing system according to claim 1, wherein the data sending unit realizes communication based on a fifth generation mobile communication system with the vehicle to be assisted.

21. The information processing system according to claim 1, wherein the position of the vehicle to be assisted is calculated by a distance measuring method employing parallax by a stereo camera.

22. A self-driving assistance method, which comprises installing a roadside information processor and a communication antenna on a roadside, the self-driving assistance method comprising:
   acquiring, via the roadside information processor, vehicle information relating to one or more vehicles to be assisted located in a coverage area covered by the communication antenna,
   generating, via the roadside information processor, transmit data including vehicle position information indicating a position of a vehicle to be assisted or drive control information, based on the acquired vehicle information, and
   sending, via the roadside information processor, the transmit data to a processor of the vehicle to be assisted via the communication antenna,
   wherein the drive control information includes a target value relating to at least one of a velocity, an acceleration, a deceleration and a steering angle of the vehicle to be assisted,
   wherein the transmit data is transmitted at a predicted time based on an estimated arrival time of the vehicle at a predetermined road position so that the vehicle to be assisted performs self-driving based on the vehicle position information and the drive control information generated by or sent from the roadside information processor, and
   wherein the estimated arrival time of the vehicle is calculated based on a rate of change of an relative distance at each process cycle.

23. The self-driving assistance method according to claim 22, wherein the communication antenna is installed in/on a building so that the coverage area covers an intersection or a road with traffic heavier than a predetermined standard.

24. The self-driving assistance method according to claim 22, wherein the communication antenna is installed in/on a building so as to cover both a communication region based on a third generation mobile communication system or a fourth generation mobile communication system and a communication region based on a fifth generation mobile communication system.

25. The self-driving assistance method according to claim 22, which further comprises installing an image sensor which makes images of the vehicle to be assisted on the roadside,
   and generating the drive control information based on sensor information from the image sensor.

26. The self-driving assistance method according to claim 22, which comprises updating map information by the vehicle information to make the vehicle to be assisted display the map information and the position information of the vehicle to be assisted.

27. The self-driving assistance method according to claim 22, wherein the position of the vehicle to be assisted is calculated by a distance measuring method employing parallax by a stereo camera.

* * * * *